US011907070B2

(12) United States Patent
Busta et al.

(10) Patent No.: US 11,907,070 B2
(45) Date of Patent: Feb. 20, 2024

(54) METHODS AND APPARATUS FOR MANAGING REGISTER FREE LISTS

(71) Applicant: Advanced Micro Devices, Inc., Santa Clara, CA (US)

(72) Inventors: Eric Busta, Fort Collins, CO (US); Michael L. Golden, Santa Clara, CA (US); Sean M. O'Mullan, Austin, TX (US); James Wingfield, Austin, TX (US); Keith A. Kasprak, Austin, TX (US); Russell Schreiber, Austin, TX (US); Michael Estlick, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 27 days.

(21) Appl. No.: 17/390,293

(22) Filed: Jul. 30, 2021

(65) Prior Publication Data

US 2023/0032375 A1    Feb. 2, 2023

(51) Int. Cl.
*G06F 11/14*    (2006.01)
*G06F 9/30*    (2018.01)
*G06F 9/50*    (2006.01)
*G06F 11/07*    (2006.01)

(52) U.S. Cl.
CPC ........ *G06F 11/1417* (2013.01); *G06F 9/3013* (2013.01); *G06F 9/5011* (2013.01); *G06F 11/0772* (2013.01)

(58) Field of Classification Search
CPC .. G06F 11/1417; G06F 9/3013; G06F 9/5011; G06F 11/0772
USPC .......................................................... 714/36
See application file for complete search history.

(56) References Cited

U.S. PATENT DOCUMENTS 6,748,519 B1 * 6/2004 Moore ................ G06F 11/1666
714/6.32
2018/0196676 A1 * 7/2018 Gschwind .......... G06F 9/30098

* cited by examiner

*Primary Examiner* — Yair Leibovich

(57) ABSTRACT

An integrated circuit includes one or more processing units that execute instructions that employ a register file, control logic creates a pre-startup register free list, prior to normal operation of at least one of the processing units, that includes a list of registers devoid of defective registers. In some implementations, no column and row repair information is provided to register file repair logic. In certain examples, the register file is configured as a repair-less register file. During normal operation of the one or more processing units, the integrated circuit employs the pre-startup register free list to select registers in a register file for the executing instructions. Associated methods are also presented.

22 Claims, 4 Drawing Sheets

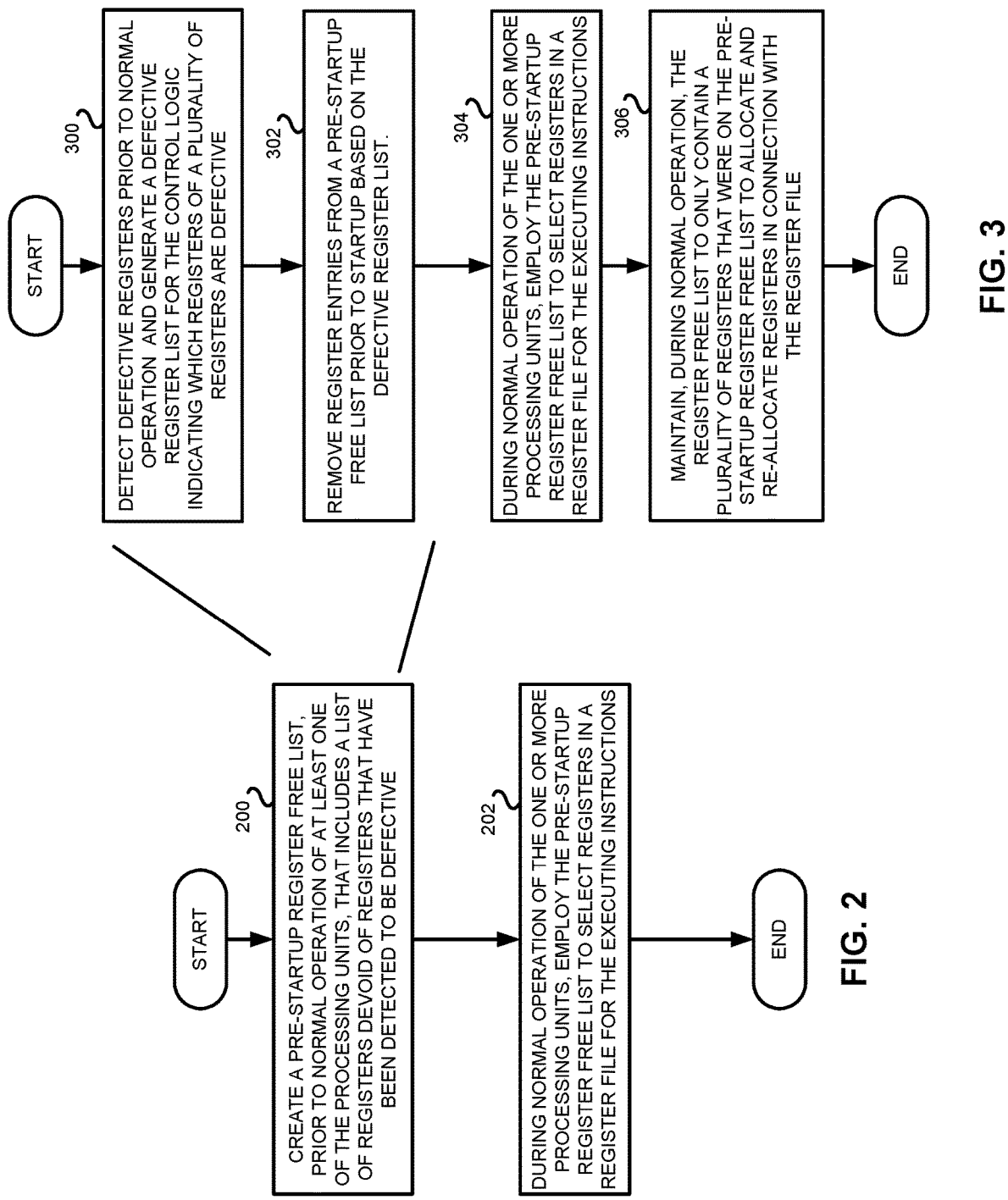

METHODS AND APPARATUS FOR MANAGING REGISTER FREE LISTS

BACKGROUND OF THE DISCLOSURE

Processing units that execute instructions use register files to store working data that can be accessed by functional units with low latency. A register file is an array of processor registers with fast memories, such as fast static random access memories (SRAM) with multiple ports or other suitable memory structures. Processing units such as CPUs, GPUs and other processors use register renaming, which allows dynamic mapping or architectural registers to physical register file entries during instruction execution. Control logic maintains a map indicating the renaming of registers wherein registers are deallocated and reallocated. Renaming includes using a register free list so that the mapping of a free register, e.g., an available physical entry in a physical register file (PRF) stores data for a particular architectural register and mapping changes dynamically during execution. The register free list is managed during normal operation and lists the registers that are free for use from the register file.

During manufacture of integrated circuits, manufacturers use register redundancy of physical registers to improve yield so that defective registers can be replaced with available redundant registers prior to shipping of the chips. For example, conventional register files employ register repair logic to re-map columns and rows of a register file to avoid storage elements that have been detected to be defective. For example, during the manufacturing process, built in self-test (BIST) logic is executed to test the registers of a register file and when defective registers are detected, the BIST sends column and row information to the register repair logic of the register file. The register repair logic replaces defective rows and columns with the redundant rows and columns. In some systems, fuse blocks are used to program the locations of the defective rows and columns so that repair logic will prevent them from being accessed. The BIST logic again can be run after manufacture to make sure no other registers are defective. If others are registers are defective, in one example, the BIST operation may fail. Alternatively, in another example, if other registers are defective, the BIST operation can attempt to repair the newly found defective rows and columns. If the newly found defective rows and columns cannot be repaired, the BIST operation will report a failure. The BIST logic maintains a list of defective rows and columns or obtains the information by reading fuse information.

Conventional register file management systems also include control logic that generates the register free list during normal operation to allow allocation and reallocation of registers in the register file. However, the register free list when generated prior to startup typically includes a list of all registers including defective registers which then have to be removed once the register file repair logic reconfigures the register file regarding which rows and columns to avoid. There is a need for an improved register file system.

BRIEF DESCRIPTION OF THE DRAWINGS

The implementations will be more readily understood in view of the following description when accompanied by the below figures, wherein like reference numerals represent like elements, and wherein:

FIG. 2 is a flowchart illustrating a method for managing register free lists in accordance with one example set forth in the disclosure;

FIG. 3 is a flowchart illustrating a method for managing register free lists in accordance with one example set forth in the disclosure;

Figure 1:
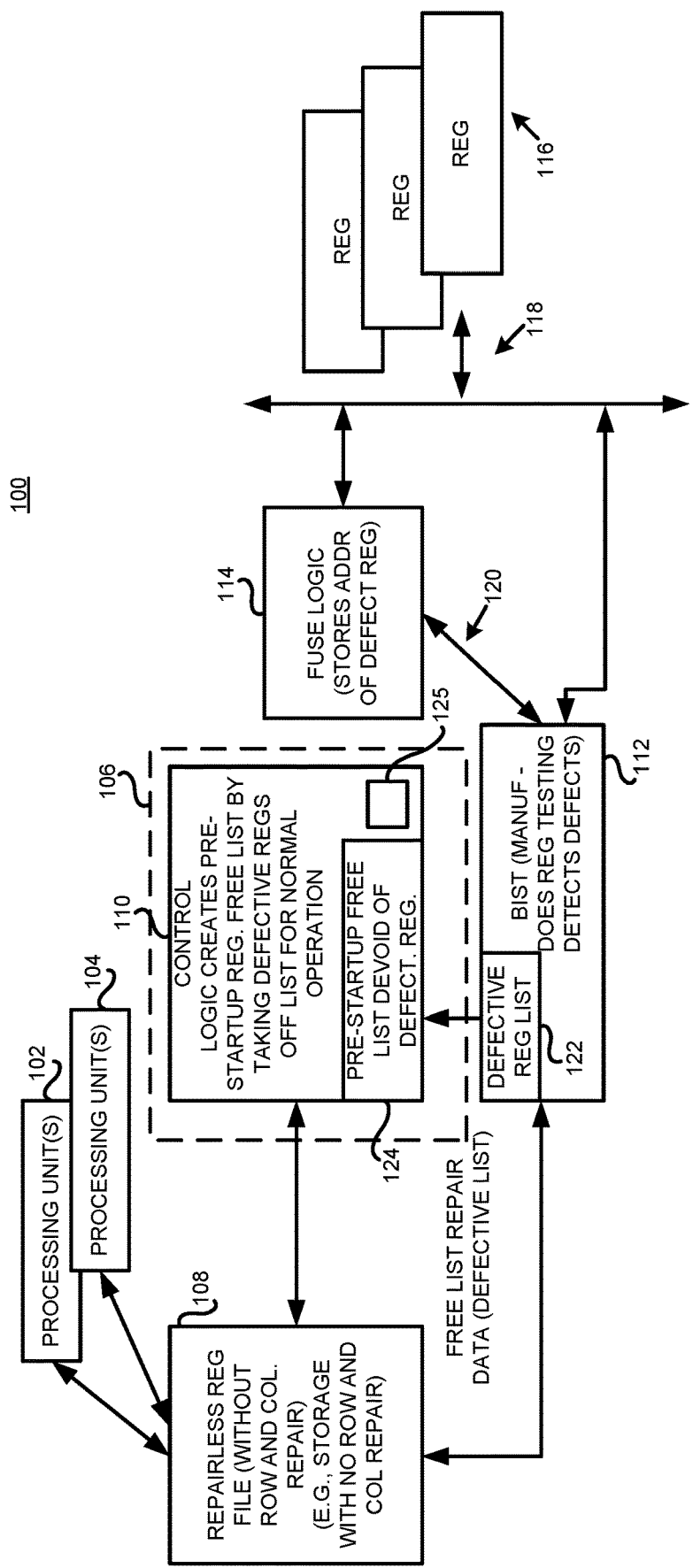
FIG. 1 illustrates a block diagram of an integrated circuit that manages register free lists in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

In some implementations, an integrated circuit and method create a pre-startup register free list prior to startup (i.e., prior to normal operation) of a processing unit, such as a CPU, GPU, floating point unit, integer unit or other suitable processing unit. The pre-startup register free list contains data representing a list of registers devoid of defective registers and no column and row repair information is sent to a register file. In some implementations, the integrated circuit includes a register file that is devoid of row and column repair logic. In certain implementations, defective registers are detected prior to normal operation of the processor (e.g, during manufacturing of the processor and/or pre-startup of the processor) based on testing by BIST logic. During normal operation, a register free list is managed to employ only registers that were initially listed on the pre-startup register free list to allocate and reallocate registers during normal operation.

In certain implementations, an integrated circuit includes one or more processing units that execute instructions that employ a register file, control logic creates a pre-startup register free list, prior to normal operation of at least one of the processing units, that includes a list of registers devoid of registers that have been detected to be defective. In some implementations, no column and row repair information is provided to register file repair logic. In certain examples, the register file is configured as a repair-less register file. During normal operation of the one or more processing units, the integrated circuit employs the pre-startup register free list to select registers in a register file for the executing instructions.

In some examples, the control logic maintains, during normal operation, a register free list to only contain a plurality of registers that were on the pre-startup register free list to allocate and re-allocate registers in connection with a register file.

In some examples, a built-in-self-test (BIST) logic detects defective registers prior to normal operation and generates a defective register list for the control logic indicating which registers of a plurality of registers are defective.

In certain examples, the control logic removes register entries from the pre-startup register free list prior to startup based on the defective register list.

In some examples, a floating-point unit (FPU) includes the one or more processing units and wherein the register file includes a floating point unit register file. In certain examples, the control logic maintains a same number of defective registers on a defective list even if a register is not defective.

In some examples, the control logic creates a pre-startup register free list for each of a plurality of processing units, prior to normal operation of each of the plurality of processing units, wherein each respective pre-startup register free list includes a list of registers devoid of registers that have been detected to be defective, and during normal operation of each of plurality of processing units, employs the respective pre-startup register free list to select registers in a respective register file for the plurality of processing units.

In certain implementations, a method carried out by one or more processing units includes creating a pre-start up register free list, prior to normal operation of at least one of the processing units, that includes a list of registers devoid of registers that have been detected to be defective. During normal operation of the one or more processing units, the method includes employing the pre-startup register free list to select registers in a register file for the executing instructions.

In some examples, during normal operation, the method includes maintaining a register free list to only contain a plurality of registers that were on the pre-startup register free list to allocate and re-allocate registers in connection with a register file.

In certain examples, the method includes detecting, by built-in-self-test (BIST) logic defective registers prior to normal operation and generating a defective register list for the control logic indicating which registers of a plurality of registers are defective.

In some examples, the method includes removing register entries from the pre-startup register free list prior to startup based on the defective register list. In certain examples, the method includes maintaining a same number of defective registers on a defective list even if a register is not defective.

In some examples, the method includes creating a pre-startup register free list for each of a plurality of processing units, prior to normal operation of each of the plurality of processing units, wherein each respective pre-startup register free list includes a list of registers devoid of registers that have been detected to be defective, and during normal operation of each of a plurality of processing units, employing the respective pre-startup register free list to select registers in a respective register file for the plurality of processing units.

In certain implementations, an integrated circuit includes one or more floating point units, a floating point unit register file, built-in-self-test (BIST) logic operative to detect defective registers of the register file prior to start-up of the one or more floating point units and control logic that creates a pre-start up register free list, prior to normal operation of at least one of the floating point units. In certain implementations, the pre-startup register free list includes a list of registers devoid of undefective registers by the BIST logic, and during normal operation of the one or more floating point units, employs the pre-startup register free list to select registers in the floating point unit register file for the executing instructions.

In some examples, the control logic maintains, during normal operation, a register free list to only contain a plurality of registers that were on the pre-startup register free list to allocate and re-allocate registers in connection with a register file. In certain examples, the register file is configured as a repair-less register file.

In some examples, the control logic removes register entries from the pre-startup register free list prior to startup based on the defective register list. In certain examples, the control logic maintains a same number of defective registers on a defective list even if a register is not defective.

In some examples, the control logic creates a pre-startup register free list for each of the plurality of floating point units, prior to normal operation of each of the plurality of floating point units, wherein each respective pre-startup register free list includes a list of registers devoid of undefective registers by the BIST logic, and during normal operation of each of plurality of floating point units, employs the respective pre-startup register free list to select registers in a respective register file for the plurality of floating point units.

FIG. 1 is a block diagram illustrating one embodiment of an integrated circuit 100 that in some implementations is a processor, system on-chip (SoC) or other suitable integrated circuit that employs one processor in some examples and multiple processing units 102 and 104 in the example shown. The processing units 102 and 104 are configured to execute instructions stored in system memory and in some examples, are CPU cores, GPU cores, floating point units (FPUs), integer units or other suitable processing units that execute instructions and use register files. In some examples, the instructions are stored in system memory. In some implementations, a processing unit 102 includes a prefetch unit coupled to an instruction cache. A dispatch unit in some implementations is configured to receive instructions from the instruction cache and to dispatch operations to a register rename unit 106. One or more schedulers are coupled to receive dispatched operations from the dispatch unit and to issue operations to the one or more processing units (e.g., cores, FPUs). The processing units include execution cores that may include, for example, one or more integer units, one or more floating point units, one or more load/store units, or other suitable configuration. Results are generated by the execution cores are output to a result bus. The results may be used as operand values for subsequently issued instructions and/or stored to a register file 108.

In this example, the register file 108 is a repair-less register file and is smaller than conventional register files. For example, the repair-less register file 108 does not include any row and column repair logic.

The register rename unit 106, in this example, includes control logic 110 that creates a pre-startup register free list as part of a pre-startup process and also updates the register free list during normal operation to facilitate allocation and deallocation of registers from the register list. The integrated circuit 100 includes built in self-test logic (BIST) 112 and fuse logic 114. During the manufacturing process, the built-in self-test logic 112 runs tests on a set of registers 116 of the register file 108 through any suitable communication links generally shown as 118 to detect which registers, if any, are defective. This operation is done, for example, during the manufacturing process so that when a chip is sent to customers, the chip only uses registers that are non-defective.

The register set 116 includes redundant registers that can be used to replace defective registers.

The control logic 110 in this example is shown as being implemented in the register rename unit 106 but may be a stand-alone component or integrated with other logic as desired. In some implementations, the control logic 110 is one or more state machines configured to carry out the operations as described herein. However, any suitable structure may be employed including field programmable arrays or other logic.

The BIST logic 112 in some examples is hardware that sends testing bits to the register set 116 to determine whether registers are not properly storing states of bits, or to detect other register malfunctions as known in the art. When a register is determined to be defective, the BIST informs the fuse logic as shown by arrow 120 to remove the defective register through a fuse process as known in the art. The BIST logic 112 maintains a defective register list 122 which includes entries identifying which registers from the register set 116 are defective based on the self-test.

Where the processing unit 102 is a floating point unit, the register file 108 is a floating point unit register file. The built-in-self-test (BIST) logic detects defective registers of the register file prior to start-up of the floating point unit and the control logic creates the pre-start up register free list 124, prior to normal operation of the floating point unit. The pre-startup register free list 124 includes a list of registers devoid of undefective registers, namely the registers that have been detected to be defective by the BIST logic. After startup (e.g., during normal operation) of the floating point unit, the control logic employs the pre-startup register free list to select registers in the floating point unit register file for the executing instructions.

Figure 4:
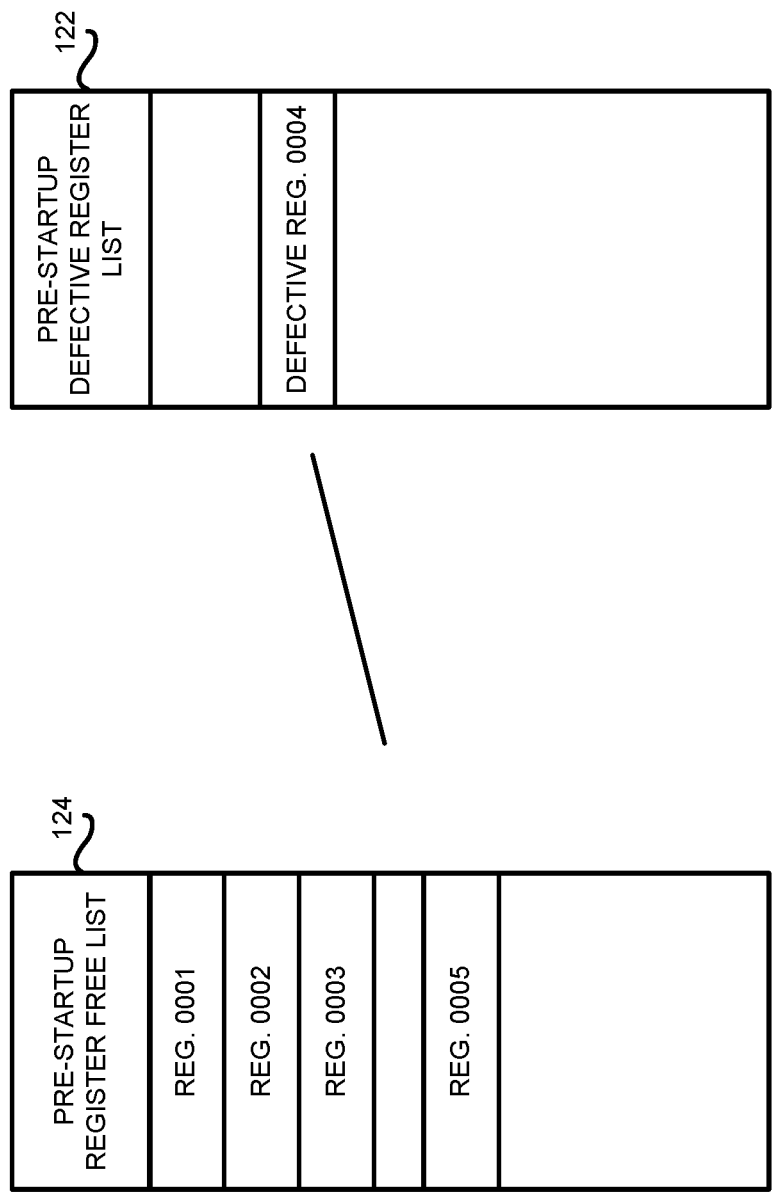
FIG. 4 is a diagram illustrating a pre-startup register free list in accordance with one example set forth in the disclosure.

Referring also to FIG. 2, a method for managing a register free list is illustrated, and in some implementations, carried out by the control logic 110, however any suitable component may perform the operations. It will be recognized that the order of operations can be changed as desired for this operation and other set forth herein. As shown in block 200, the method includes creating a pre-startup register free list 124 during a pre-startup phase such as prior to normal operation of the processing unit 102. In some implementations, the pre-startup register free list 124 includes entries that include data representing a list of registers that is devoid of registers that have been detected to be defective. For example, during a pre-startup of the processors, the control logic obtains the defective register list 122 generated by the BIST logic 112. The control logic 110 initially uses a default register free list that includes all registers in the register set 116 in some implementations, and removes from that list, as shown in FIG. 4, those defective registers listed in the defective register list 122.

As shown in block 202, during normal operation of the processing unit, the control logic 110 employs the pre-startup register free list 124 to select registers in the register file 108 to execute instructions. For example, the control logic 110 only allocates those registers in the register file 108 that are on the pre-startup register free list. The BIST logic 112 does not send column and repair data to the register file as with conventional systems. In this implementation, the register file 108 is a repair-less register file without row and column repair logic. The defective register list 122 serves as a type of free list repair data so that before normal operation, a pre-startup register free list includes only those registers that are operational (e.g., non-defective). Defective registers are not listed as being potential registers.

FIG. 3 illustrates a method for maintaining a register free in accordance with some implementations described herein. As shown in block 300, the method includes detecting defective registers prior to normal operations, such as by the BIST logic 112, and generating a defective register list 122 for the control logic 110. The defective register list 122 includes entries including data representing which registers of a register set 116 are defective based on the self-test results by the BIST. As shown in block 302, the method includes removing register entries from an initial pre-startup register free list prior to startup based on the defective register list 122 to create the pre-startup register free list 124. For example, the control logic in some implementations creates an initial pre-startup register free list with all registers of the register set 116 including defective registers. The defective register list 122 is then used by the control logic 110 to remove defective registers from the initial list resulting in the pre-startup register free list 124 that is devoid of defective registers.

As shown in block 304, the method includes, during normal operation of the one or more processing units, employing the pre-startup register free list 124 to select registers in register file 108 for executing instructions. This is done in some examples by the control logic 110. For example, when an instruction needs a register during normal operation after startup, the pre-startup register free list 124 is used by the control logic to select a register for the instruction from the pre-startup register free list 124 and map the register to a register in the register file 108 that is free. As shown in block 306, during normal operation, such as after startup, the method includes maintaining a register free list 125 during normal operation to only contain registers that were on the pre-startup register free list 124 to allocate and reallocate registers in connection with the register file 108. For example, during normal operation, the register free list 125 is maintained that only includes registers that were on the pre-startup register free list that was devoid of defective registers so that no defective registers appear as potential free registers.

In some implementations, a same number of defective registers is maintained on the defective register list 122 even for registers that are not defective. This is managed by the control logic. This is done so that all parts, even if not defective, have the same number of registers visible on the free list, so parts with and without defects have the same performance and measurable register file size.

Where the integrated circuit 100 includes multiple processing units 102 and 104, the control logic 110 in some implementations is replicated for each processing unit and in other implementations, manages the pre-startup register free list 124 and register free list 125 during normal operation for each of the processing units. Each respective pre-startup register free list includes a list of registers devoid of undefective registers, as previously described.

FIG. 4 diagrammatically illustrates an example of the pre-startup register free list 124 having registers 0001, 0002, 0003 and 0005 listed as available registers for use by instructions for a processing unit prior to normal operation of a processing unit. The pre-startup register free list 124 excludes register 0004 because it has been detected as being defective by the BIST logic 112 and appears in the defective register list 122. During normal operation when registers are allocated and de-allocated from the free list due to use or availability in the register file, the register free list 125 in maintained to avoid using register 0004.

Figure 5:
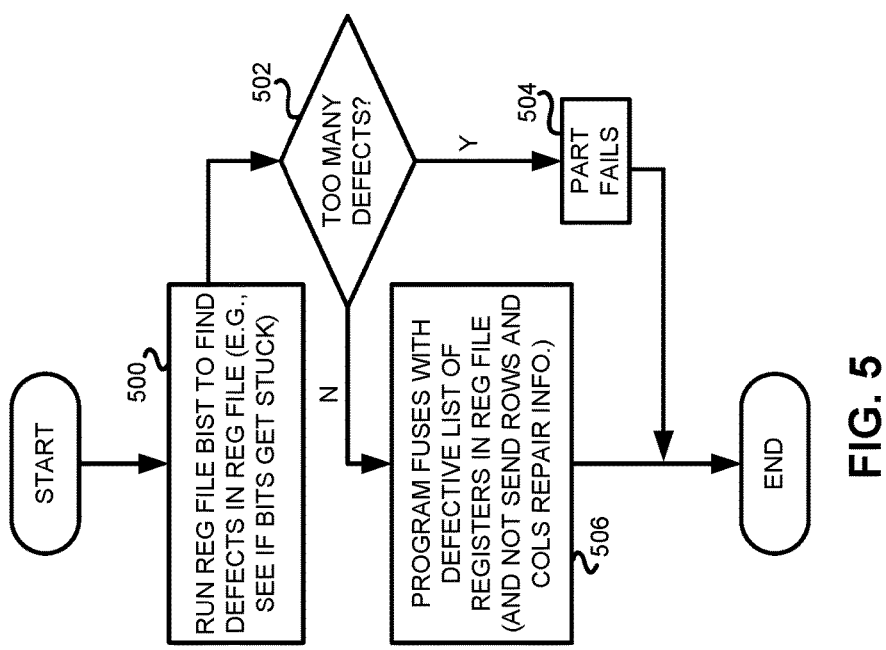
FIG. 5 is a flowchart illustrating a method for managing register free lists in accordance with one example set forth in the disclosure.

FIG. 5 illustrates a method for managing a register free list that in some implementations is carried out by the built-in self-test logic 112. As shown in block 500, the method includes running self-tests to find defects in the register set 116 to see, for example, whether certain bits at certain locations in the register file, or registers get stuck. As shown in block 502, the number of defects is compared to a threshold set by a manufacturer, for example, and if too many register defects are detected, the part fails as shown in block 504. However, as shown in block 506, if an acceptable number of defects is detected, the method includes programming fuses, such as by the fuse logic 114 with the defective list of registers in the register file to remove the defective registers from operation. The BIST creates the list of defective registers 122. Row and column information is not sent to the register file 108 and the register file 108 does not contain row and column repair logic.

For example, where register files may have 128×64 bit entries, with conventional approaches the chip manufacturers may include 130 entries to allow two redundant registers in a register file. The data bit width may also be increased from, for example, 64 bits to 66 bits to allow, for example, two row and column repair configuration. However, the register file row and column repair logic adds additional complexity and cost to the integrated circuit. During normal operation, when rows and columns of registers in the register file that are defective need to be skipped, extra time can occur for accessing the register file as well. In some implementations disclosed herein, row and column information is not sent to the register file 108 and the register file 108 does not contain row and column repair logic.

Figure 6:
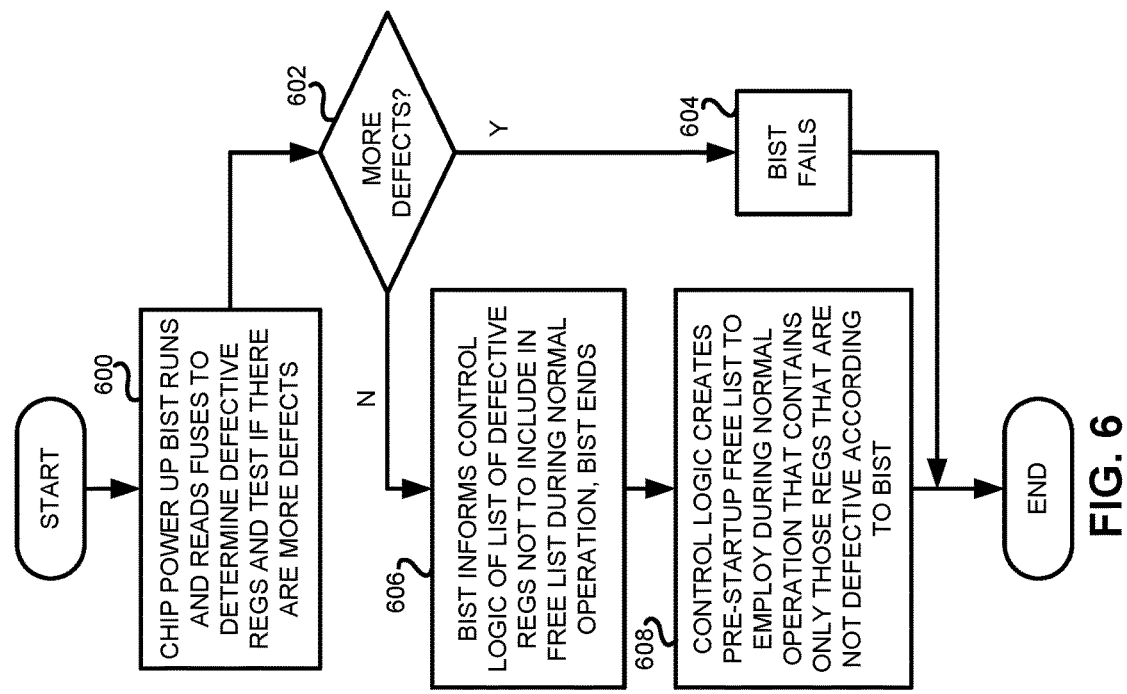
FIG. 6 is a flowchart illustrating a method for managing register free lists in accordance with one example set forth in the disclosure.

FIG. 6 is an example of a method for managing a register free list as carried out after the initial operation during the manufacturing process described with respect to FIG. 5. As shown in block 600, the method includes the BIST logic 112 upon chip power up, running and reading the fuse information, such as the defective register list 122, from the fuse logic 114 that previously stored the defective register identifiers and tests if there are more defective registers. If there are more defective registers, as shown in block 602, the chip is considered to be bad in the field and the BIST fails as shown in block 604. However, if no more defects are detected, the method includes as shown in block 606, the BIST logic 112 informing the control logic 110 of the list of defective registers 122 not to include in the pre-startup register free list 124 and the register free list 125 during normal operation. For example, the defective register list 122 previously stored from the operation shown in FIG. 5 during the manufacturing process. As shown in block 608, the method includes the control logic 110, in some implementations, creating the pre-startup register free list 124 as previously described to employ during normal operation. The pre-startup register free list includes only those registers that are not defective according to the BIST defective register list 122.

Stated another way, to effectively repair defects in a register file, the control logic 110 uses entries from a free list. In operation, a test is done (e.g., by the BIST) to find defective entries (corresponding to defective registers) from an initial pre-startup register free list. In some implementations this is done by using the defective register list to remove entries from the initial pre-startup register free list. Register renaming is done while avoiding defective entries. In some implementations the BIST finds defective registers, also referred to as defective entries of the register file by running the self-test on registers. The BIST programs a control register with defective entries to create the defective register list 122. The control logic 110 accesses the control register to determine the defective list of registers and removes the defective registers from the initial register free list. The BIST test will pass when run subsequent times with known defective entries. The BIST programs the fuse logic with the defective entries to remove the defective registers from use. As such the integrated circuit has fixed defective register file entries and has a permanent pre-startup register free list entry count. Upon future power ups, the integrated circuit can test (e.g., BIST) and reset normally.

In some implementations, to make all parts appear the same, the same number of registers are removed from the pre-startup register free list by the control logic. In some implementations, a programmable control register is programmed by the manufacturer to have the same number of registers removed in the pre-startup register free list even though some of the removed registers are not defective. The control logic compares the number of defective registers from the BIST to the programmed amount and if fewer are not defective, the control logic makes the free list exclude a number to match the programmed amount.

Among other technical benefits, size and complexity of the register file is reduced, and yield is improved in a more efficient manner. In some examples, all parts will have the same performance, even those with fewer defects. The reduction in size and complexity can allow for a register file with more entries, providing increased performance.

Although features and elements are described above in particular combinations, each feature or element can be used alone without the other features and elements or in various combinations with or without other features and elements. The apparatus described herein in some implementations use software or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An integrated circuit comprising:
one or more processing units that execute instructions that employ a register file; and
control logic, operative to:
create a pre-startup register free list, prior to normal operation of at least one of the one or more processing units, that comprises a list of registers devoid of defective registers; and
during normal operation of the one or more processing units, employ the pre-startup register free list to select registers in the register file for executing instructions.

2. The integrated circuit of claim 1 wherein the control logic is operative to maintain, during normal operation, a register free list to only contain a plurality of registers that were on the pre-startup register free list to allocate and re-allocate registers in connection with a register file.

3. The integrated circuit of claim 1 comprising the register file configured as a repair-less register file.

4. The integrated circuit of claim 1 comprising a built-in-self-test (BIST) logic operative to detect defective registers prior to normal operation and generate a defective register list for the control logic indicating which registers of a plurality of registers are defective.

5. The integrated circuit of claim 4 wherein the control logic is operative to remove register entries from the pre-startup register free list prior to startup based on the defective register list.

6. The integrated circuit of claim 1 comprising a floating-point unit (FPU) comprising the one or more processing units and wherein the register file comprises a floating point unit register file.

7. The integrated circuit of claim 1 wherein the control logic is operative to maintain a same number of defective registers on a defective list even if a register is not defective.

8. The integrated circuit of claim 1 wherein the control logic is operative to:
create a pre-startup register free list for each of a plurality of processing units, prior to normal operation of each of the plurality of processing units, wherein each respective pre-startup register free list comprises a list of registers devoid of registers that have been detected to be defective; and
during normal operation of each of plurality of processing units, employ a respective pre-startup register free list to select registers in a respective register file for the plurality of processing units.

9. The integrated circuit of claim 1 wherein the control logic is configured to, in response to a detection of one or more registers being defective out of a plurality of registers, create a pre-startup register free list, prior to normal operation of at least one of the one or more processing units, that comprises a list of registers devoid of the one or more defective registers.

10. A method carried out by one or more processing units comprising:
create a pre-startup register free list, prior to normal operation of at least one of the one or more processing units, that comprises a list of registers devoid of defective registers; and
during normal operation of the one or more processing units, employ the pre-startup register free list to select registers in a register file for executing instructions.

11. The method of claim 10 comprising maintaining, during normal operation, a register free list to only contain a plurality of registers that were on the pre-startup register free list to allocate and re-allocate registers in connection with a register file.

12. The method of claim 10 comprising detecting, by built-in-self-test (BIST) logic defective registers prior to normal operation and generate a defective register list for control logic indicating which registers of a plurality of registers are defective.

13. The method of claim 12 comprising removing register entries from the pre-startup register free list prior to startup based on the defective register list.

14. The method of claim 10 comprising maintaining a same number of defective registers on a defective list even if a register is not defective.

15. The method of claim 10 comprising:
creating a pre-startup register free list for each of a plurality of processing units, prior to normal operation of each of the plurality of processing units, wherein each respective pre-startup register free list comprises a list of registers devoid of defective registers; and
during normal operation of each of plurality of processing units, employing a respective pre-startup register free list to select registers in a respective register file for the plurality of processing units.

16. The method of claim 10 comprising in response to a detection of one or more registers being defective out of a plurality of registers, creating a pre-startup register free list, prior to normal operation of at least one of the one or more processing units, that comprises a list of registers devoid of the one or more defective registers.

17. An integrated circuit comprising:
one or more floating point units;
a floating point unit register file, operatively coupled to the one or more floating point units;
built-in-self-test (BIST) logic operative to detect defective registers of the floating point unit register file prior to start-up of the one or more floating point units; and
control logic, operative to:
create a pre-startup register free list, prior to normal operation of at least one of the one or more floating point units, that comprises a list of registers devoid of defective registers detected by the BIST logic; and
during normal operation of the one or more floating point units, employ the pre-startup register free list to select registers in the floating point unit register file for executing instructions for the one or more floating point units.

18. The integrated circuit of claim 17 wherein the control logic is operative to maintain, during normal operation, a register free list to only contain a plurality of registers that were on the pre-startup register free list to allocate and re-allocate registers in connection with the floating point unit register file.

19. The integrated circuit of claim 17 comprising the floating point unit register file configured as a repair-less floating point unit register file.

20. The integrated circuit of claim 17 wherein the control logic is operative to remove register entries from the pre-startup register free list prior to startup based on a defective register list.

21. The integrated circuit of claim 17 wherein the control logic is operative to maintain a same number of defective registers on a defective list even if a register is not defective.

22. The integrated circuit of claim 17 wherein the control logic is operative to:
- create a pre-startup register free list for each of a plurality of floating point units, prior to normal operation of each of the plurality of floating point units, wherein each respective pre-startup register free list comprises a list of registers devoid of defective registers by the BIST logic; and
- during normal operation of each of the plurality of floating point units, employ a respective pre-startup register free list to select registers in a respective register file for the plurality of floating point units.

\* \* \* \* \*